(No. Model.) 2 Sheets—Sheet 1.
C. J. VAN DEPOELE.
UNDERGROUND CONDUIT FOR ELECTRIC RAILWAYS.
No. 408,639. Patented Aug. 6, 1889.
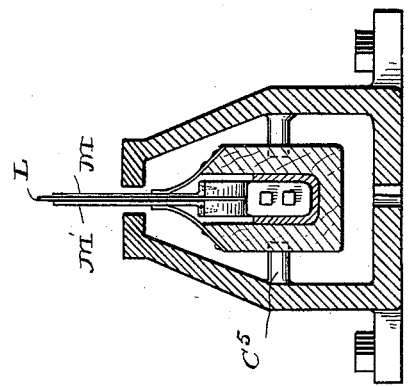
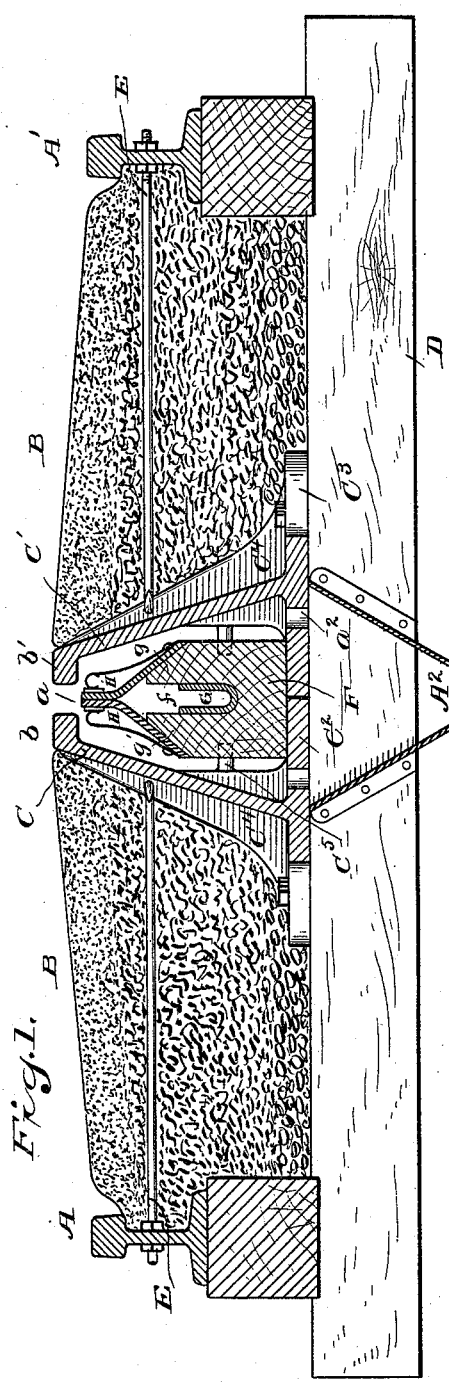
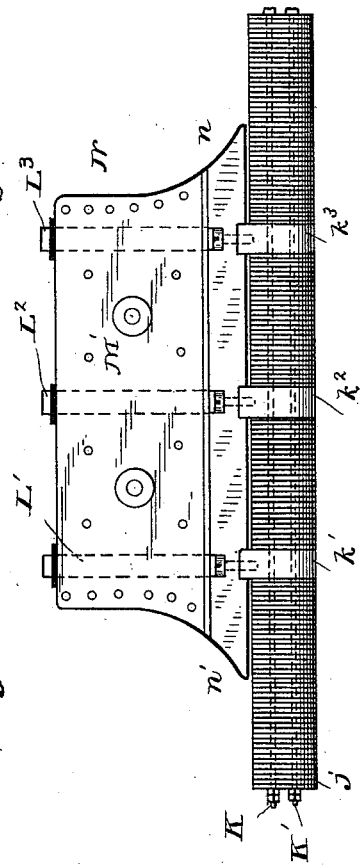
Witnesses
H. A. Lamb
C. L. Sturtevant
Inventor
Charles J. Van Depoele
By his Attorney
Frankland Jannus (No Model.) 2 Sheets—Sheet 2.
C. J. VAN DEPOELE.
UNDERGROUND CONDUIT FOR ELECTRIC RAILWAYS.
No. 408,639. Patented Aug. 6, 1889.
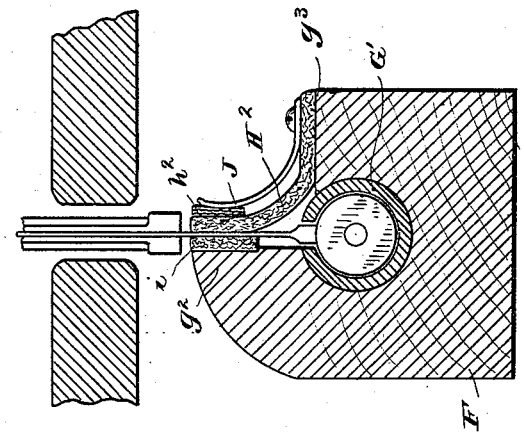
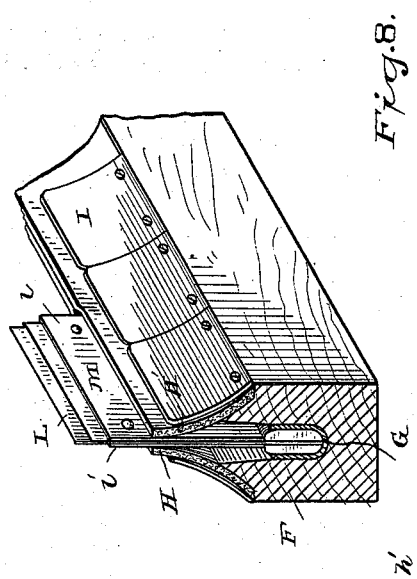
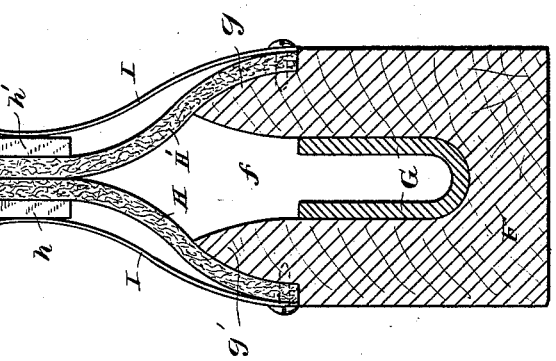
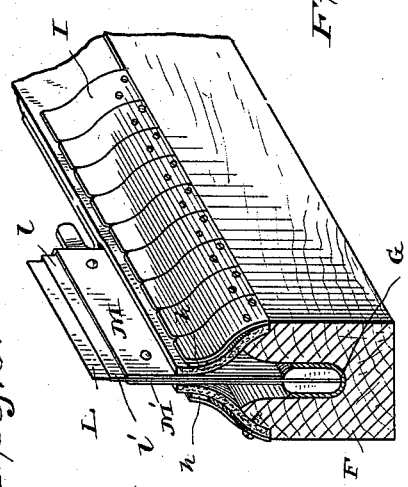
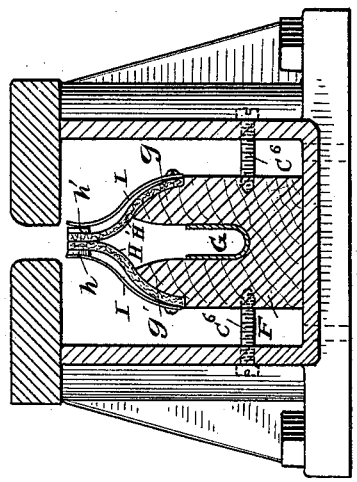
Witnesses
H. A. Lamb
C. L. Sturtevant
Inventor
Charles J. Van Depoele
By his Attorney
Frankland Jannus

UNITED STATES PATENT OFFICE.

CHARLES J. VAN DEPOELE, OF LYNN, MASSACHUSETTS.

UNDERGROUND CONDUIT FOR ELECTRIC RAILWAYS.

SPECIFICATION forming part of Letters Patent No. 408,639, dated August 6, 1889.

Application filed June 24, 1889. Serial No. 315,366. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Underground Conduits for Electric Railways, of which the following is a description, reference being had to the accompanying drawings, and to the letters and figures of reference marked thereon.

My invention relates to improvements in conduits for electric-railway conductors.

The chief characteristics of the conductor forming the subject of the present application are a strong exterior casing or conduit proper of metal or other material having the necessary structural strength, said conduit being arranged below the surface of the roadway or line of travel and having its upper edges about even with the general surface of the roadway, said upper portion of the conduit being slitted to allow the movement therein of a current-collecting device. The electric conductor or conductors are mounted upon an insulating-support contained within the conduit and provided with a normally-closed covering, casing, or protector, by which the conductor is practically inclosed within its insulating-support. The support, however constructed, is entirely within the conduit and the conductor-inclosing material is provided with a longitudinal slit which, though normally closed, is capable of being forced open by the traveling-contact device and will automatically close behind it, thus protecting the conductor from extraneous matter that may be forced through the surface-slot by the travel upon the street or roadway.

Various details of the invention herein set forth are shown, described, and claimed in an application filed by me May 29, 1889, Serial No. 312,613, the present application covering improvements upon what is shown in my said prior case in the matter of the means for inclosing and isolating the conductor.

The details of several forms of conduit embodying the invention will be fully hereinafter referred to in the appended claims.

In the drawings, Figure 1 is a transverse sectional elevation of a conduit embodying my invention, showing also its arrangement with relation to the roadway and tracks of a railway. Fig. 2 is an elevation, on an enlarged scale, of a traveling-contact device suitable for use in connection with my improved conduit. Fig. 3 is an end elevation of the traveling contact seen in Fig. 2. Fig. 4 is an end view, partly in section, showing a conduit differing slightly in form from that seen in Fig. 1. Fig. 5 is an enlarged sectional end view of the conductor-support and protective casing. Figs. 6 and 7 are perspective views of forms of conductor-support and protective casing differing somewhat in detail. Fig. 8 is a transverse sectional end view showing a conductor-support and protective casing differing slightly in arrangement from the forms seen in the other figures, and showing also portions of an inclosing conduit and a traveling-contact device in operative position.

In the drawings, A A' are the rails of a railway. B indicates the paving or filling employed between the said rails where the line of travel is through a street.

$b$ $b'$ are the surface portions or capping-plates of the conduit, between which exists a continuous open slot $a$, in which may move the traveling current-collecting device.

The exterior protective casing or conduit proper may be constructed in a number of different ways, set forth in patents already granted to me; but, as indicated in Fig. 1, said conduit is composed of sections of side walls C C', which are provided with extended portions or feet $C^2$ $C^3$ at their lower portions. The feet of the side walls of the conduit rest upon the cross-ties D, by which the rails are supported, and are desirably so proportioned that when the feet $C^2$ $C^3$ meet at their inner extremities the side walls will be held at the desired distance apart and the standard width of the surface-slot $a$ be established and maintained. The side walls C C' extend upwardly at an angle to prevent injury thereto from the lateral pressure of the surrounding earth when frozen, and they are provided with reenforcing ribs $C^4$, sufficient in number to impart the desired strength and rigidity to the structure and to prevent said side walls being broken or injured by the weight of heavy vehicles passing thereover. The said side walls are furthermore additionally sustained by the use of tie-rods E, which are hooked or otherwise attached to the ribs $C^4$ and connected to the rails or other rigid portion of the railway structure.

The conduit so formed constitutes an open-slotted channel or chamber, within which is placed an insulating-support for the conductor, which said support is provided with means for entirely isolating the conductor and protecting it from moisture and also from extraneous matter that may come in through the slot of the conduit.

Various materials might be used for the insulating conductor-support—as, for example, a bed of concrete might be formed in the lower portion of the conduit, or strips of fibrous material formed in a variety of ways might be employed; but I find that wood which has been coated or lubricated with a preservative compound will answer all purposes.

The conductor-support F consists, therefore, as here shown, of wooden sections united in any convenient manner, so as to be rendered practically continuous and formed with a deep groove $f$ in their top side or surface. The conductor may assume a variety of forms, being shown in Figs. 1, 4, 5, 6, 7 as U-shaped and in Fig. 8 as cylindric. It may also obviously be flat, solid, or cylindric, if preferred. Of whatever shape, the conductor G is sustained within the groove $f$ of the support F. The upper edges $g$ $g'$ of the support F are desirably sloped off, and to them are secured continuous strips H H' of flexible water-proof material—such, for example, as leather, rubber, painted canvas, canvas and layers of rubber secured together—in fact, any material or combination of materials that will possess enough stiffness to sustain their own weight in a vertical position.

Along the upper outer edges of the strips H H' are secured additional strips $h$ $h'$ of a relatively stiff material. Strips of metal or of wood, or even of fabric, may be employed for this purpose, the object being to re-enforce the upper meeting-edges of the strips H H' to prevent them from buckling, warping, and twisting, to assist in keeping the said strips in shape, and to insure the complete closing of the conductor-containing groove when the strips H H' are pressed together by oppositely-acting springs. Springs I I are applied upon either side of the conductor-support and arranged to press against the strips $h$ $h'$ at suitable intervals. By the pressure of these springs the said strips and the strips H' H' are normally kept in close contact throughout the conduit.

An obvious modification of the foregoing is seen in Fig. 8, in which the support F is formed with one vertical wall $g^2$, a central groove for the reception of the conductor shown in this instance as a slitted tube G'. A narrow strip of leather or similar material $i$ is secured against the vertical wall of the support F. A movable or expansible strip $H^2$ is secured upon the ledge $g^3$ and extends upward and its upper edge comes in contact with the strip $i$, thus entirely inclosing the conductor-containing groove. A strip of fabric or other material $h^2$ may be used in this case also to re-enforce the flexible strip $H^2$, and a continuous series of springs J are secured at their lower ends upon the ledge $g^3$ and press with their upper portions against the strip $h^2$, thereby holding the inner edge of the strip $H^2$ normally in close contact with the strip $i$ and closing the conductor-chamber.

In Fig. 6 is indicated a section of the conductor-support constructed, as described, with reference to Fig. 5. It will be understood, however, that where the flexible strips are of sufficient solidity or stiffness the re-enforcing strips $h$ $h'$ $h^2$ may be dispensed with and the construction indicated in Fig. 7 be employed.

It is preferred that the conductor-support F shall not entirely fill the body of the conduit and that space shall exist between the sides and bottom, if desired, of the conductor-support and the inner walls of the conduit, so as to permit all extraneous matter entering through the slot to pass by the conductor-support and to find its way into a continuous trough or channel $A^2$, which should be formed below the conduit, and which is further provided with outlets $a^3$, of any desired character and sufficient in number to permit of flushing the said channel $A^2$ to remove therefrom accumulations of any sort whatever.

The conductor-support F may be sustained by stationary pins, studs, or extensions $C^5$, formed upon the inner sides of the side walls C and registering with holes formed in the support F; but the said supports $C^5$ may with advantage in some cases be made adjustable, as at $C^6$, Fig. 4, where screws are indicated by means of which the support F can be aligned, and, furthermore, when screws $C^6$ are used, no previously-prepared holes need be provided in the support F.

In a conduit where the conductor is so thoroughly isolated and protected, as hereinbefore described, the lower or drainage channel may safely be flushed to remove débris, &c., without danger of grounding the conductor, as would almost certainly be the case were the conductor or conductors sustained upon supports within the conduit and otherwise wholly exposed. The form of conduit seen in Fig. 1 would ordinarily form a closed chamber except for the surface-slot; but when such form is employed I make slits or openings $a^2$ along the bottom, so as to permit the downward passage of foreign matter. A somewhat different form of conduit is seen in Fig. 4; but being fully described in other of my pending applications, this particular structure need not be herein further referred to.

The contact device by which current is collected according to my present invention comprises a disconnected series of thin metallic plates $j$, which may be made thin and resilient or thick and solid, as preferred. The plates $j$ are strung on two longitudinal metallic rods K K', and said rods pass through metallic extensions $k'$ $k^2$ $k^3$, between which plates $j$ are fitted, and the entire series of contact-plates are firmly secured by suitable set-screws upon the extremities of the rods K K'. A metallic plate L, or a number of metallic strips L' L² L³, are attached in any convenient manner to the metallic blocks $k'$ $k^2$ $k^3$ and are of sufficient height to extend above the surface of the conduit when the contacts $j$ are in engagement with the conductor. The conducting-plate L or strips L' L² L³ are inclosed between plates $l$ $l'$ of insulating material, and the insulating-plates $l$ $l'$ are in turn covered and protected by strong metallic plates M M', the whole being firmly secured together and constituting an elongated blade N, of less width than the slot $a$, in the conduit. The blade N is also desirably formed with sloping front and rear extensions $n$ $n'$, to assist in separating the conductor-inclosing medium with an upward movement, which, it will be obvious, would produce the least friction and wear.

Having described my invention, what I claim, and desire to secure by Letters Patent, is—

1. A conduit for electric-railway conductors, comprising a slotted exterior conduit, an interior insulating conductor-support, and a slitted flexible casing or cover attached to the conductor-support and within the conduit, substantially as described.

2. A conduit for electric-railway conductors, comprising a slotted exterior conduit, an interior insulating conductor-support, and a slitted flexible casing or cover attached to the conductor-support and within the conduit, and a traveling contact device adapted to enter through the slot of the conduit and to open the conductor-inclosing casing during its passage, the said casing closing behind it, substantially as described.

3. A conduit for electric-railway conductors, comprising an exterior slotted protective conduit, an insulated or insulating conductor-support, a longitudinally-slitted flexible or yielding casing or cover inclosing the conductor within its support, and a series of springs acting against the flexible material to normally close the conductor-chamber, substantially as described.

4. A conduit for electric-railway conductors, comprising an exterior slotted protective conduit, an insulated or insulating conductor-support, a longitudinally-slitted flexible or yielding casing or cover inclosing the conductor within its support, and a series of springs acting against the flexible material to normally close the conductor-chamber, and reenforcing strips along the edges of said flexible material, substantially as described.

5. A conduit for electric-railway conductors, comprising an exterior metallic conduit having a continuous surface-slot therein, a continuous grooved support of wood or other insulating material, a main supply-conductor sustained within the groove in the support, flexible non-conducting strips carried by the conductor-support and arranged when in contact to close the conductor-containing groove or channel, and springs acting against the flexible material to keep said strips in contact and the channel closed, substantially as described.

6. In electric railways, a conduit comprising metallic side walls formed or provided with surface or capping plates at their upper edges and with extended feet or flanges at intervals along their lower edges, said feet or flanges being formed to sustain the side walls in relatively-sloping positions, cross-ties for sustaining the feet of the side walls of the conduit, rails sustained upon the cross-ties, and tie-rods extending from the rails to the side walls of the conduit for laterally sustaining the same and preventing closure of the surface-slot under pressure, substantially as described.

7. A conduit for electric-railway conductors, comprising an exterior metallic casing, an interior insulating conductor-support and projections or extensions extending inwardly from the walls of the exterior casing and engaging and sustaining the conductor-support out of contact with the walls of the casing, substantially as described.

8. A conduit for electric railways, comprising an exterior metallic casing, an interior insulating conductor-support, and adjustable extensions, as screws, extending through the walls of the casing and engaging and sustaining the conductor-support, whereby the same may be positioned or aligned, substantially as described.

In testimony whereof I hereto affix my signature in presence of two witnesses.

CHARLES J. VAN DEPOELE.

Witnesses:
FRANKLAND JANNUS,
JOHN W. GIBBONEY.